United States Patent [19]

Alaniz et al.

[11] Patent Number: 5,823,146
[45] Date of Patent: Oct. 20, 1998

[54] ANIMAL RESTRAINING DEVICE

[75] Inventors: Glenn R. Alaniz, Delton; William H. Claflin, Augusta; Deborah R. Reeves, Vicksburg; Dale Vandermolen, Portage, all of Mich.

[73] Assignee: Pharmacia & Upjohn, Kalamazoo, Mich.

[21] Appl. No.: 900,939

[22] Filed: Jul. 28, 1997

Related U.S. Application Data

[60] Provisional application No. 60/032,599 Dec. 11, 1996.
[51] Int. Cl.$^6$ ........................................... A61D 3/00
[52] U.S. Cl. ........................................................ 119/725
[58] Field of Search ................................... 119/725, 726, 119/727, 728, 756

[56] References Cited

U.S. PATENT DOCUMENTS

| | | | |
|---|---|---|---|
| 1,366,178 | 1/1921 | Hatch. | |
| 4,428,326 | 1/1984 | Dubovick et al. | 119/727 |
| 4,655,173 | 4/1987 | Pope | 119/754 |
| 5,009,196 | 4/1991 | Young | 119/728 |

FOREIGN PATENT DOCUMENTS

| | | |
|---|---|---|
| 7213620 | 4/1974 | Netherlands. |
| WO 9001910 | 3/1990 | WIPO. |

*Primary Examiner*—Robert P. Swiatek
*Assistant Examiner*—James S. Bergin
*Attorney, Agent, or Firm*—Flynn, Thiel, Boutell & Tanis, P.C.

[57] ABSTRACT

An animal restraining device including a restraining litter and a support frame. The frame supports the litter thereon and has features which facilitate an adjusting of the width between support members of the litter and an adjusting of the height of the frame. The frame has a V-shaped head end facilitating ease of access to a head of an animal resting on the litter. The litter has leg apertures therein for receiving legs of an animal and allowing the legs to dangle below the litter. The frame has an entry side for facilitating entry of the litter with an animal therein. The litter need not be raised high above the frame and then lowered into the interior of the frame. The litter containing the animal and legs of the animal will enter, unimpeded by the frame, through the entry side into the interior of the frame, by only raising the support members of the litter a little bit above the frame. A bearing surface is provided on the side of the frame for supporting a support member of the litter therein and to effect a removing of a portion of the litter from the side of an animal resting thereon.

16 Claims, 6 Drawing Sheets

FIG. 1

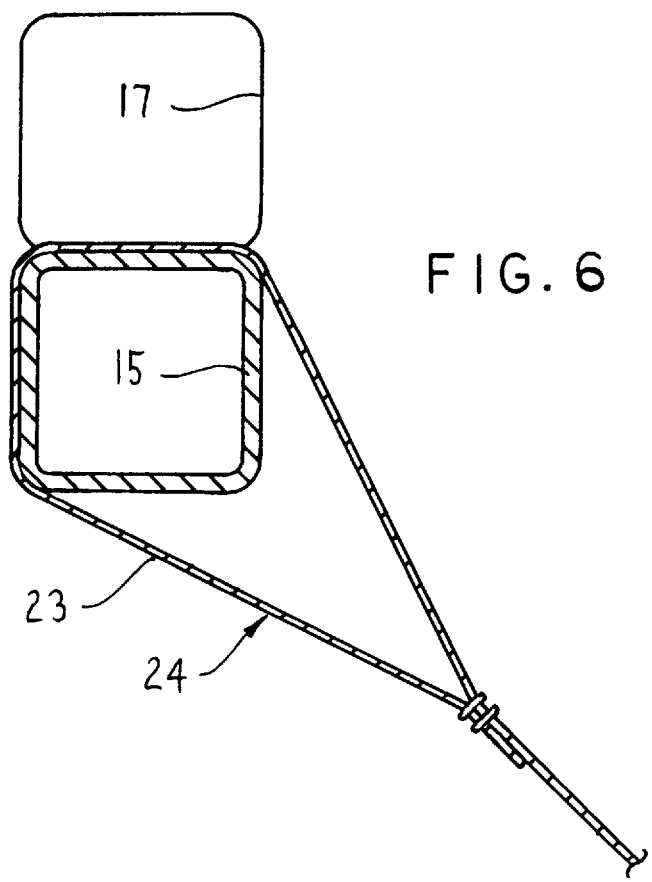

ANIMAL RESTRAINING DEVICE

CROSS-REFERENCE TO RELATED APPLICATION

This application claims the benefit of the following provisional application: U.S. Ser. No. 60/032,599, filed Dec. 11, 1996, under 35 USC 119(e)(i).

FIELD OF THE INVENTION

The present invention relates to an animal restraining device and, more particularly, to a support for an animal restraining litter which is removably supported on the support so as to provide convenient access to the animal for veterinary, grooming, or laboratory procedures.

BACKGROUND OF THE INVENTION

When handling animals in a veterinary or laboratory setting, it is desirous to humanely immobilize the animal for the animal's own safety and comfort in addition to the safety of its handlers. Various types of restraining systems have been designed to immobilize animals, however many of these restraining systems have undesirable qualities. Some older restraining systems rotate the restrained animal onto its back. Most animals, particularly swine, find being on their backs quite disconcerting. Thus, the animal will struggle against the restraining system to right itself. Struggling may result in injury to the animal, animal handlers, or an error during a procedure.

Many prior restraining systems do not provide adequate access to the restrained animal, particularly in the case of sling type restraining systems. Animal slings support an animal from below and envelope its sides. While a sling provides adequate support for an animal, it restricts access to the animal for many investigative procedures, for example catheterization. Additionally, many slings are supported on a frame which further impedes access to the animal due to the structure of the frame. Prior animal-restraining frames require that the sling containing the animal be lifted above the frame and then be lowered onto the frame with the animal positioned in the interior of the frame. This lifting of the sling with the animal therein requires strong handlers having the ability to raise the animal and sling above the entire frame. This can be quite troublesome because the frames are designed to keep the animal from touching the floor and position the animal at an advantageous height for treatments, experiments or the like, typically at a height most convenient for the handlers during a particular treatment, etc.

The objects and purposes of this invention address the above-described drawbacks of prior animal restraint devices or systems, particularly animal slings. Accordingly, an object of this invention is to provide an improved animal restraining device allowing ease of mounting a litter holding an animal onto a supporting frame. A further object of this invention is to provide an improved animal restraining device, as aforesaid, with increased access to the animal being restrained and providing for additional animal comfort. A further object of this invention is to provide a readily transportable animal restraining device.

SUMMARY OF THE INVENTION

The object and purposes of the invention are met by providing an animal restraining device having a frame for supporting a litter in a position oriented above a floor surface. The frame includes a plurality of elongate upright support posts resting on the floor and oriented spaced apart from and parallel to one another so as to define corners of a polygon configuration. A plurality of horizontally oriented first frame members are provided on the frame and extend coextensively with a perimeter of the polygon configuration and interconnect respective pairs of the support posts at a location spaced downwardly from an upper end thereof. A plurality of horizontally oriented second frame members extend coextensively with the perimeter and interconnect respective pairs of the support posts adjacent the upper ends thereof on all but one side of the polygon configuration. A litter supporting first bearing surface is provided adjacent the upper end of each of the support posts coplanar with others of the first bearing surfaces. The litter has at least two elongate support members, and a flexible material for holding an animal thereon connected to and extending between the support members. Each of the support members have a second bearing surface oriented at locations thereon that coincide with the first bearing surfaces so that the second bearing surfaces will each rest on a respective one of said first bearing surfaces to support the litter thereon. The flexible material has plural animal leg receiving apertures therein so that legs of an animal supported on an upper side of the flexible material will extend through the apertures and dangle beneath the flexible material so that as said litter is moved onto and off from the frame in a general direction horizontally perpendicular to the one side, the legs of the animal will dangle freely through a region of the frame that is free of the second frame member thereby making it unnecessary to elevate the litter to a sufficient height to enable the legs of the animal to clear a second frame member.

Further, objects and purposes of the invention will be apparent to persons acquainted with apparatus of this general type upon reading the following description and reviewing the accompanying drawings.

BRIEF DESCRIPTION OF THE DRAWINGS

A preferred embodiment of the present invention is described in detail hereinafter with reference to the accompanying drawings, in which:

FIG. 1 is top, front, isometric view of an animal restraining device which embodies the present invention;

FIG. 6 is a sectional view taken along the line 6—6 of FIG. 1.

DETAILED DESCRIPTION

Figure 1:
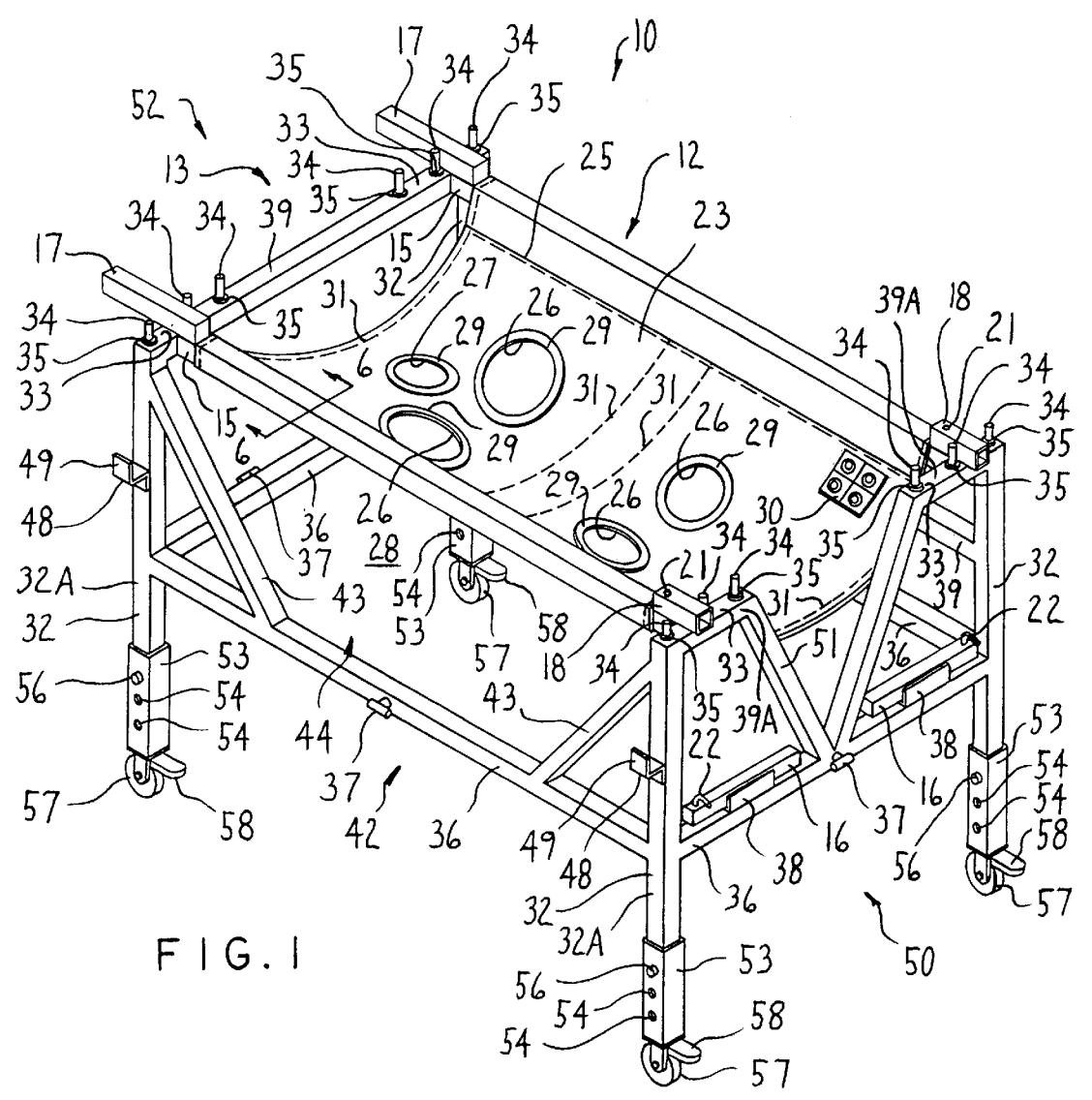

FIG. 1 shows an animal restraining device 10 for supporting an animal. The animal restraining device 10 includes a litter 12 and a litter supporting frame 13. The litter 12 is removably supported on the frame 13.

Figure 2:
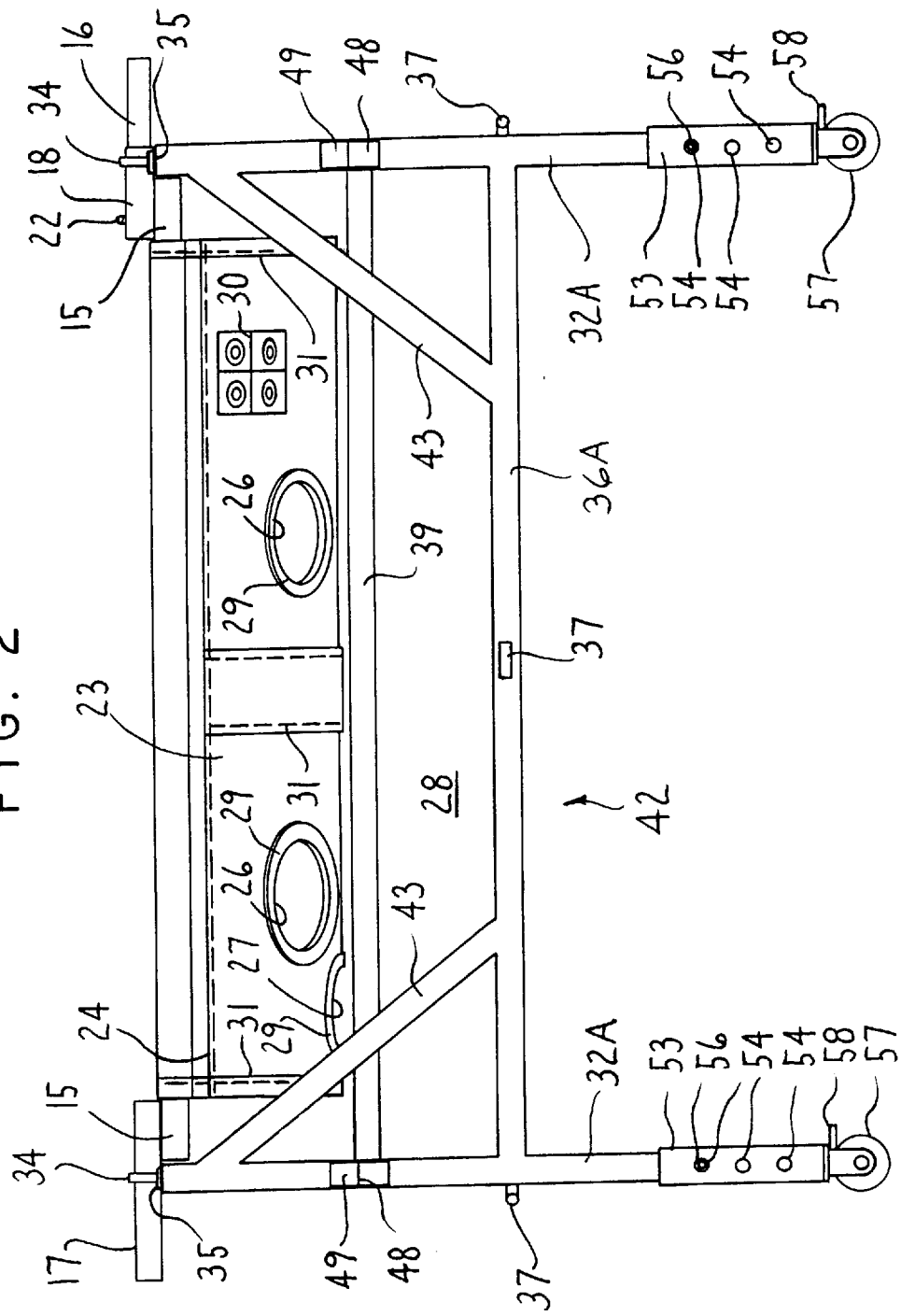
FIG. 2 is an entry side view of the animal restraining device.
Figure 3:
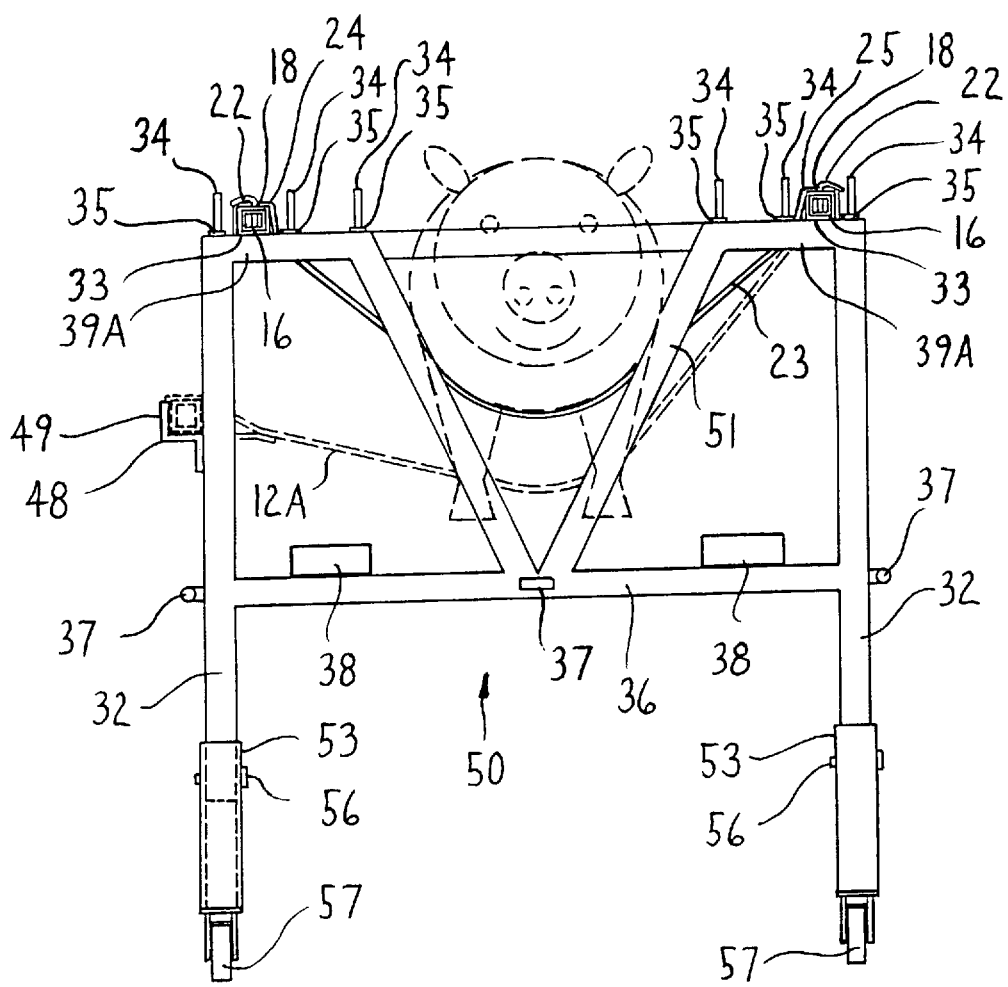
FIG. 3 is a view of the animal head end of the animal restraining device showing the lowered position of the litter in broken line and with an animal also shown in broken line.
Figure 4:
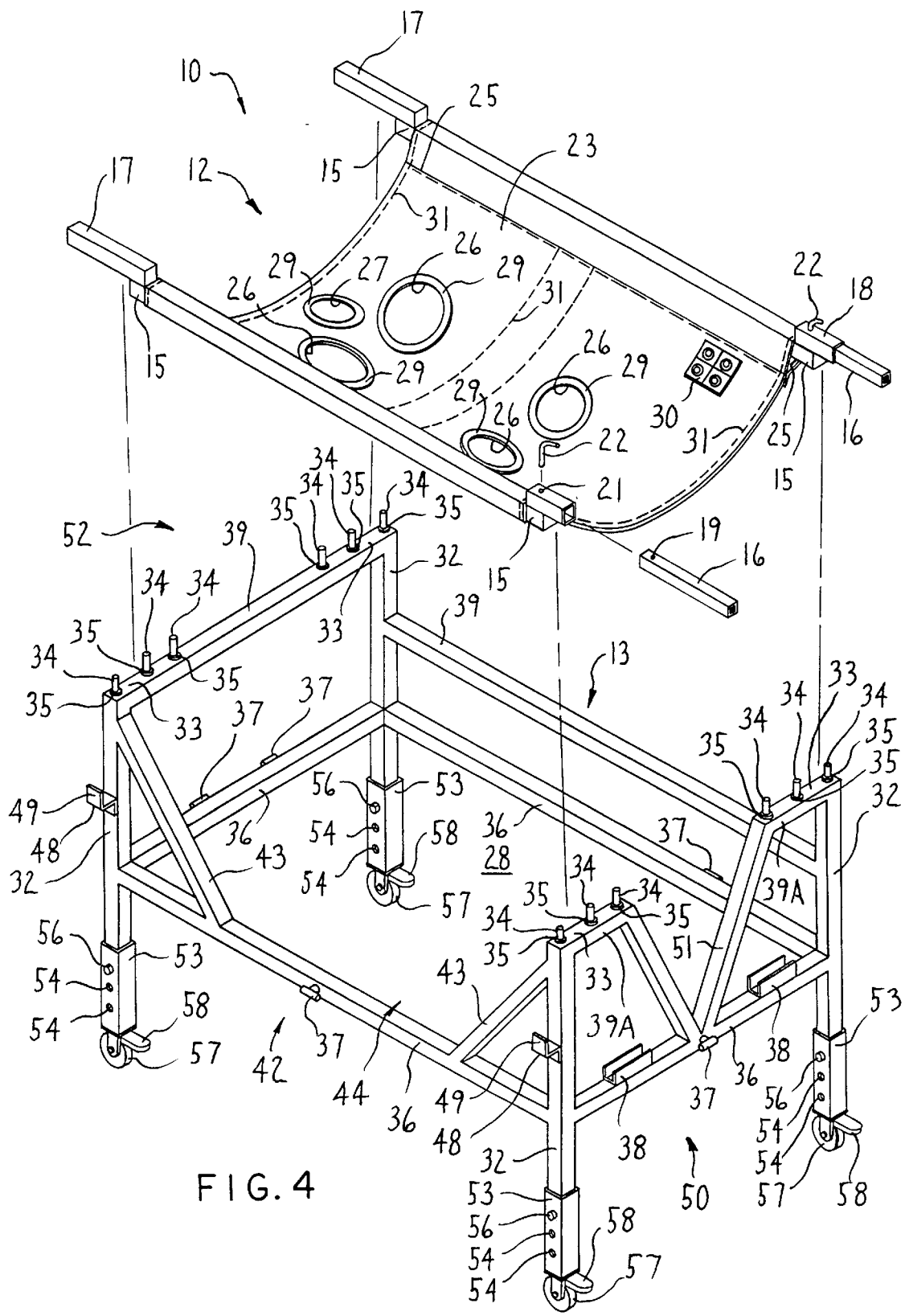
FIG. 4 is an exploded isometric view of the animal restraining device.

The litter 12 has two elongate and, in this particular embodiment, parallel support bars or members 15 and removably attached handles 16 at one end of both support members 15 and fixed handles 17 at the other end of both support members 15. Removably attached handles 16 are received in hollow handle receiving members 18 fixedly secured to the support members 15 (FIGS. 2 and 3). The receiving members 18 and handles 17 are fixedly secured to the upper side of the support member 15, such as by welding. The handles 16, as shown in FIGS. 1 and 4, are elongated and square in cross section. The removable handles 16 are conformed in shape to and have an outer dimension slightly smaller than the hollow interior of the receiving member 18. A bore 19 extends through each of the removable handles 16 (FIG. 4). A hole 21 in the handle receiving member 18 is coaxially aligned with the bore 19 when the handle 16 is telescopically positioned within the handle receiving member 18. A pin 22, generally configured to the shape of the bore 19 and hole 21, is received in the bore 19 and hole 21 to lock the handles 16 in the handle receiving members 18. The underside of the fixed handles 17 and handle receiving members 18 act as a bearing surface for supporting the litter 12 on the frame 13 as explained below. The identically sized handles 16, 17 are adapted to be gripped by an animal handler for carrying or transporting an animal on the litter 12 to the frame 13 or other location.

The handles 16 are removable so that no structure attached to the litter 12 will extend beyond one end of the frame 13 (FIG. 1). If, for example, the handles 16 extend beyond the frame 13, personnel may accidentally bump into the handles 16 thereby disturbing the entire animal restraining device 10 and possibly compromising an ongoing surgical or laboratory procedure, or causing harm to the attending personnel. Additionally, during transport of the animal restraining device 10, if the handles 16 are not engaged by an animal handler, then they may undesirably engage or snag on an item in the environment. Handles 17, which are fixedly secured to the support members 15, may be used in guiding the movement of the animal restraining device 10.

A flexible material 23, such as canvas or other like materials, extends between and is operatively connected to the two support members 15. That is, the lateral edges of the flexible material are each formed into an elongate, sufficiently large sized, loop 24, 25 and the support members 15 with handle 17 and handle receiving member 18 thereon are each removably inserted through a respective loop 24, 25. An upper side of the material 23 adopts a hammock-like appearance which is adapted to support an animal thereon. The flexible material has animal leg receiving apertures 26 therein, each adapted to receive a respective one of the legs of the animal to thus secure and restrain the animal in a more natural position thereby enhancing the comfort of the animal. The leg apertures 26 allow the animal's legs to dangle below the material 23 of the litter 12 into an interior section 28 of the frame 13 and above the floor surface as will be explained in more detail below. Further, a feces receiving aperture 27 is provided in the material 23 for hygienic concerns in a laboratory or veterinary environment. Thus, the waste from an animal falls away from the animal through the feces receiving aperture 27 to a location below the material 23 of the litter 12, preferably into a collection device (not shown) oriented in the interior region 28 of the frame 13. The apertures 26, 27 are reinforced around the edges thereof as at 29 to increase the durability of the material 23 and thus prevent accidental dislodging of the animal from the litter 12 or injuring the animal due to a tearing of the material 23 beginning at the apertures 26, 27. The apertures 26, 27 may be reinforced by any method suitable for reinforcing flexible materials such as hemming, stitching, or adding additional reinforcing material therearound.

When holding larger animals in the litter 12, it is necessary to reinforce the material 23 itself. Such reinforcing 31 is shown on the material 23 in broken lines in FIGS. 1, 2, 4 and 5. For example, the reinforcing 31 may be nylon straps stitched onto the material 23. The width or strength of the reinforcing 31 depends on the particular animal that is to be supported on the material 23. The material 23 is chosen so that it is washable after removal from the support members 15. It is highly desirable to disinfect the material 23, such as by washing, so that the material 23 may be repeatedly used in a surgical or laboratory environment.

Figure 5:
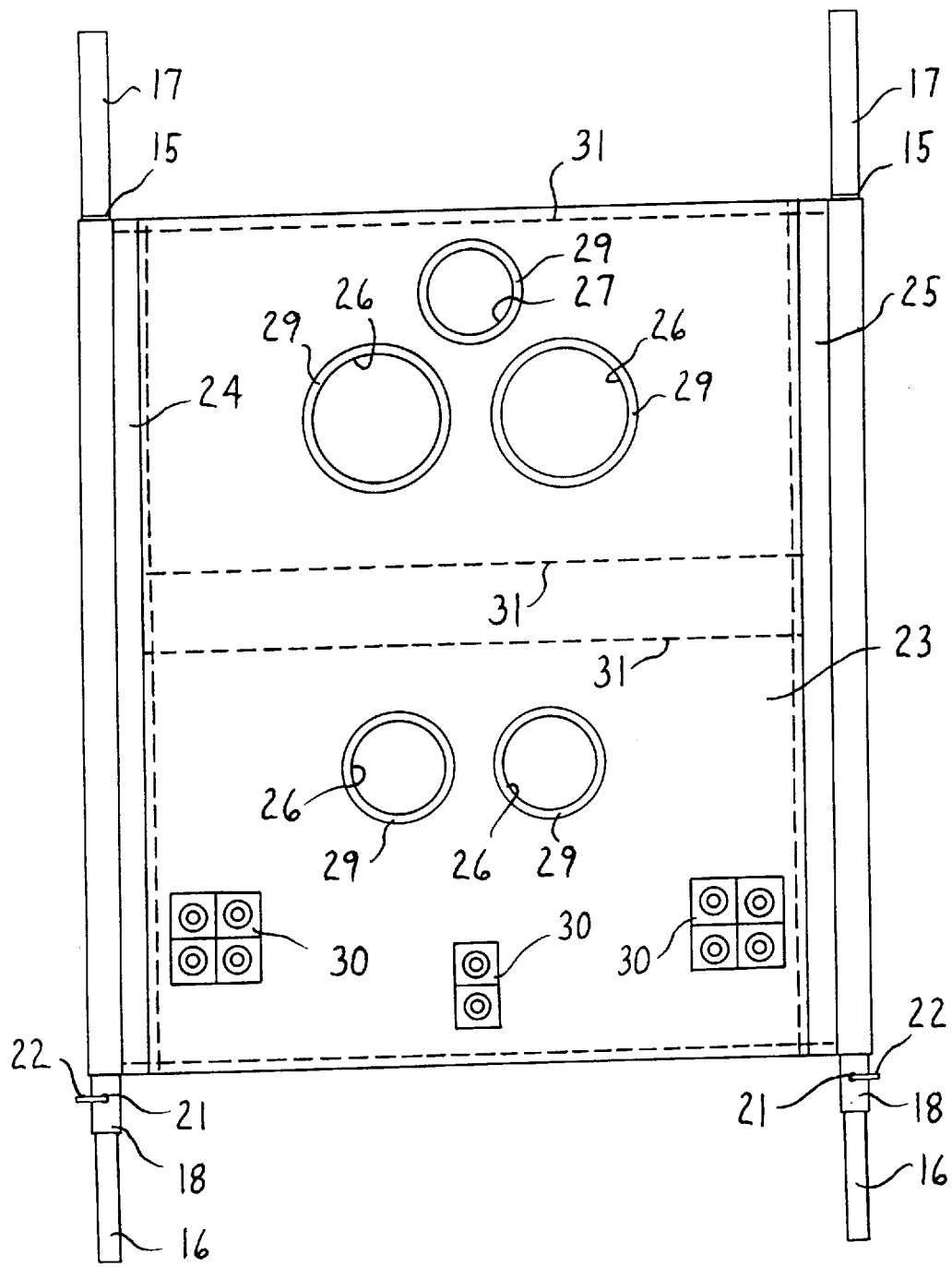
FIG. 5 is a top plan view of the litter.

The litter 12, specifically the material 23 thereof, has head restraint apertures 30 positioned directly in the litter 12. The head restraint (not shown) is a halter humanely adapted to securely capture therein the head of an animal. The head restraint includes structure adapted to operatively connect in a known manner to the material 23 at the restraint apertures 30. The placement of the head restraint apertures 30 on the material 23 remotely orients the ropes or lines (not shown) of the head restraint threaded through the apertures 30 in the material 23 of the litter 12 to thereby prevent the lines from extending outside the periphery of the litter 12 for increased safety. FIG. 5 also illustrates additional head restraint apertures 30 centrally located in the material 23 of the litter. That is, the lines are less likely to become tangled with a caretaker or other apparatus during a procedure or transport of the animal restraining device 10.

In the illustrated embodiment, the frame 13 is constructed from square, hollow tubing. Other types and styles of construction parts used to build the frame 13 are deemed to be within the scope of this invention. The frame 13 has four upright corner support legs or posts 32 extending vertically upright relative to a generally horizontal floor surface. Bearing surfaces 33 are partially defined by the top ends of each of the upright posts 32. The bearing surfaces 33 lie generally within the same horizontal plane with each other. This plane is preferably parallel to the floor surface.

Each upright corner post 32 is connected to a mutually adjacent upright corner post 32 by a lower reinforcing bar or member 36. As illustrated in the drawing figures, the lower members 36 hold the support posts 32 in a generally rectangular configuration. However, the frame 13 is not limited solely to rectangular configurations, as other polygon configurations are also within the scope of this invention. The lower members 36 are positioned at about a midheight location on the upright member 32, preferably positioned just below the midheight part of the upright member, for example 4 inches below the midpoint of a 36" high upright member.

On the lower reinforcing members 36 there are provided multiple cleats 37 for securing an animal's leg or head harness thereto via ropes or lines (not shown). Securing an animal to the cleats 37 restrains the animal from entanglement with surrounding equipment and prevents the accidental release of the animal. Further, brackets 38 for receiving and securing the removable handles 16 are advantageously positioned on the lower members 36 adjacent the support posts 32 to thereby allow quick and easy access to the handles 16 when placing the handles thereon or removing the handles therefrom, while still storing the handles 16 out of the way of the animal handlers and equipment. The brackets 38 are U-shaped channels with an inner dimension slightly larger than the outer dimension of the removable handles 16.

The frame 13 also has upper reinforcing bars or members 39. The upper members 39 further brace the frame 13 to provide a secure sling-type gurney animal restraint device 10. The upper members 39 extend between and connect the upper areas of the mutually adjacent upright posts 32 to each other along all but two sides of the frame 13. Preferably, the top surface of at least some of the upper members 39 lie within the same plane as the top surfaces of the support posts 32 so as to further define a continuance of the bearing surfaces 33. The handles 17 and the handle receiving members 18 rest on the bearing surfaces 33 for supporting the litter 12 on the frame 13. Thus, the frame 13 resembles an open box-like configuration for supporting the support members 15 of the litter 12 on the bearing surfaces 33 while allowing the material 23 supporting the animal to hang into the interior region of the frame 13 as shown in FIGS. 1 and 3. These additional bracing upper members 39 provide the requisite strength to allow the frame 13 to support a litter 12 holding animals of different size and weight, in particular swine.

The frame has an entry side 42 (FIG. 2) with strategically placed entry side upper members 43. The entry side 42 lacks the upper member 39. The entry side upper members 43 connect the upper area of the entry side support posts 32A to the respective lower member 36A (FIG. 2). Thus, the entry side upper members 43 extend diagonally downward toward and connect to the entry side lower member 36A creating an open entry region 44 above the entry side upper and lower members 43, 36A, respectively. The open region 44 allows the animal handlers to easily place an animal containing litter onto the frame 13. That is, the handlers need not lift a litter 12 high above all the upper supports 39 and then lower the litter onto the bearing surfaces 33 of frame 13. This is particularly difficult when the legs of an animal that extend through the leg apertures 26 are dangling below the litter 12. The litter 12 need only be raised high enough for the support members 15 to clear the top of the entry side support posts 32A (FIG. 2) and the stubs 34 thereon. The animal's legs will be allowed to clear the lower member 36A and move horizontally into the interior region 28 of the frame 13 through the open region 44.

The entry side pair of support posts 32A (FIG. 2) has a further bearing surface, shown as brackets or hooks 48, thereon for receiving and supporting a support member 15 of the litter 12. The hooks 48 are positioned downwardly from the top of each of the pair of support posts 32A. The support surface part of the hooks 48 extends essentially parallel to the bearing surface 33 and outwardly from the entry side support posts 32A. The hooks also include upwardly extending flanges 49 integrally connected to the hook 48 to define a cradle for facilitating a support of the handles 17 and handle receiving member 18 in the cradle part of the hook 48. Thus, the handles 17 and handle receiving member 18 of the support member 15 on the side of the frame 13 from which the hooks 48 project, shown on the left in FIG. 3, may be raised off the respective bearing surface 33 and lowered for placement of the support member 15 into the cradle of the hooks 48. The positioning or lowering of the support member 15 into the cradle of the hooks 48 provides superior access to an animal in the restraining device 10 by causing a lowering of the material 23 along one side of the animal. The lowered position is shown in FIG. 3 at 12A. An easier manual placement of an animal in the sling is also achieved when the litter 12 is placed on the frame 13 with the support member 15 placed into the cradle of the hooks 48, and then the animal is placed on the material 23 of the litter 12.

The frame 13 also has a head end 50 (FIG. 3). The head end 50 also lacks the upper member 39 extending directly between two adjacent posts 32. On the head end, the upper member 51 has a generally V-shape with the point or apex region of the "V" being attached to the respective lower member 36. This configuration of the head side upper member 51 allows improved access to the head of the animal. The head end upper member 51 includes a pair of horizontally aligned segments 39A extending horizontally at the same level as the upper member 39 and in opposite directions from the upper ends of the head end upper members 51 and are secured to the posts 32 at the head end. The upper surface of the segments 39A further define a continuance of the bearing surfaces 33.

The bearing surfaces 33 have stubs 34 projecting upwardly therefrom. The stubs 34 are adapted to provide a stop for the handle receiving member 18 or handle 17 to facilitate a stationary holding of each of the support members 15 onto the bearing surfaces 33. The stubs 34 may be fixedly attached to the bearing surfaces 33 or removably received, as by a threaded coupling, in apertures 35 in the bearing surface 33. Alternatively, the stubs 34 may be externally threaded bolts extending through the apertures 35 with the head end contacting an underside of the tubing defining the bearing surface and a nut for securing the bolt in the aperture 35 contacting an exterior surface of the tubing. Handles 17 and handle receiving member 18 of the support members 15 of the litter 12 are adapted to be positioned onto the bearing surface 33 allowing selected stubs 34 to act as a stop preventing the support members 15 from sliding on the bearing surface 33 toward the geometric center of the device 10.

The longitudinal axes of the handle receiving member 18 and the handle 17 fixedly secured to each support member 15 are coaxial and radially offset from a longitudinal axis of the respective support member 15. Further, the support members 15 each have a finite length no greater than equal to the horizontal spacing between the support posts 32A on the entry side so that respective opposite longitudinal ends of the support members 15 will mutually oppose a surface on the support posts 32A and be retained therebetween when the litter 12 is positioned on the frame.

The litter 12 may further be adjusted on the frame 13 along the bearing surfaces 33 at the head end 50 and tail end 52 of the frame 13. As explained above, the stubs 34 are spaced laterally from one another along the upper surface of the upper members 39 and 39A. By placing the fixed handles 17 and handle receiving members 18 so that each abuts a select stub 34, an adjustment of the width of the litter 12 is facilitated to safely accommodate a wider range of animals in the animal restraining device 10. The support members 15 are of a length to fit between adjacent pair of support posts 32 at the head and tail ends 50, 52 of the frame 13 with only a little clearance therebetween.

The height of the restraining device 10 is adjustable. A hollow tubular foot sleeve 53 adjustably receives the lower end of a respective support post 32. The foot sleeve 53 has multiple holes 54 therein extending vertically along the vertical height of the foot sleeve 53. The lower end of each of the support posts 32 has holes therein for alignment with a selected hole 54 in the foot sleeve 53. Once a pair of holes corresponding to the selected height of the device 10 are aligned, a peg 56, or preferably a nut and bolt assembly, is received in each set of aligned holes for fixedly positioning the device 10 at the selected height.

Casters or wheels 57 are attached to the bottom of each of the foot sleeves 53. The wheels 57 are similar to wheels commonly used on gurneys. The wheels 57 mobilize the animal retraining device 10. Conventional wheel locks 58 are provided to selectively lock the wheels 54 so as to selectively immobilize the animal restraining device 10. In this embodiment, the wheel locks 58 frictionally press against the wheels 57 to effect the locking thereof.

Although a particular preferred embodiment of the invention has been disclosed for illustrative purposes, it will be recognized that variations or modifications of the disclosed device, including the rearrangement of parts lie within the scope of the invention.

The embodiment of the invention in which an exclusive property or privilege is claimed are defined as follows:

1. An animal restraining device, comprising:

a frame for supporting a litter in a position oriented above a floor surface, said frame having an animal head end, said frame including:

a plurality of elongate upright support posts resting on the floor and oriented spaced apart from and parallel to one another so as to define corners of a polygon configuration;

a plurality of horizontally oriented first frame members interconnecting respective pairs of said support posts at a location spaced downwardly from an upper end thereof;

a plurality of horizontally oriented second frame members extending coextensively with said perimeter and interconnecting respective pairs of said support posts adjacent said upper ends thereof on all but one side of said polygon configuration, said second frame member at said animal head end being configured to provide an upwardly opening access opening through which access to an animal head is facilitated; and means defining a litter supporting first bearing surface adjacent said upper end of each said support post coplanar with others of said first bearing surfaces; and said litter having at least two elongate support members, and a flexible material for holding an animal thereon connected to and extending between said support members, each said support member having means thereon defining second bearing surfaces oriented at locations thereon that coincide with said first bearing surfaces so that said second bearing surfaces will each rest on a respective one of said first bearing surfaces to support said litter thereon, said flexible material having plural animal leg receiving apertures therein so that legs of an animal supported on an upper side of said flexible material will extend through said apertures and dangle beneath said flexible material;

whereby as said litter is moved onto and off said frame in a general direction horizontally perpendicular to said one side, the legs of the animal will dangle freely through a region of said frame that is free of a said second frame member thereby making it unnecessary to elevate said litter to a sufficient height to enable the legs of the animal to clear a second frame member.

2. The animal restraining device according to claim 1, wherein said frame further has an animal tail end and an elongate side, said elongate side being opposite said one side, wherein each said support post is positioned at each joined end of said sides, said head end having means thereon defining a substantially V-shaped frame member extending between respective said support posts thereat defining said upwardly opening access opening for allowing access to a head of the animal, said V-shaped frame member having an apex region thereof fixed to a respective said first frame member oriented at said head end.

3. The animal restraining device according to claim 1, further comprising a hook means positioned on each said support post for receiving a respective said support member therein so as to provide better access to an animal on said litter or easier placement of an animal onto said litter.

4. The animal restraining device according to claim 1, wherein each said support post has a wheel on a lower section thereof, said wheel contacting the floor surface to thereby mobilize said frame.

5. The animal restraining device according to claim 4, wherein each said support post has a means for locking said wheel preventing rotational movement of said wheel.

6. The animal restraining device according to claim 1, wherein each said support post has a means thereon for facilitating an adjusting of the height of said support posts and thus the animal resting on said litter supported on said frame.

7. The animal restraining device according to claim 1, wherein said flexible material includes a feces receiving aperture therein allowing waste from an animal on said litter to fall through said feces receiving aperture to a region below said litter.

8. The animal restraining device according to claim 7, wherein said flexible material is a canvas-type material having a central reinforcing portion and a reinforcing aperture means for reinforcing said apertures around each said aperture therein.

9. The animal restraining device according to claim 1, wherein said litter has removable handle means at one end of said support members for gripping by hands of a first handler of said litter and fixed handle means at the other end of said support members for gripping by hands of a second handler of said litter, said fixed handle means defining part of said second bearing surfaces; and wherein a handle receiving means for receiving said removable handle means is fixedly secured to said one end of said support members, said handle receiving means defining part of said second bearing surfaces.

10. The animal restraining device according to claim 9, wherein said first bearing surfaces each include an upstanding stub extending therefrom, said handle receiving means rests against a respective side of one said stub, and said fixed handle means rests against a side of another said stub.

11. The animal restraining device according to claim 9, wherein said flexible material has loops extending along elongate lengths thereof, said loops being of sufficient diameter to slidably receive one said support member and said handle receiving means therein, and said loop solely receiving said one support member therein while an animal is positioned on the flexible material.

12. The animal restraining device according to claim 9, wherein longitudinal axes of said handle receiving means and said handle on respective said support members are coaxial and radially offset from a longitudinal axis of respective said support members, said support members each having a finite length no greater than equal to a horizontal spacing between mutually adjacent upright support posts on said one side of said frame so that respective opposite longitudinal ends of said support members will mutually oppose a surface on said upright support posts and be retained therebetween when said litter is positioned on said frame.

13. The animal restraining device according to claim 1, wherein said first frame members extend completely coextensively with a perimeter of said polygon configuration and respectively interconnect all adjacent pairs of said support posts.

14. The animal restraining device according to claim 13, wherein said first frame members are spaced upwardly from a lower end of said support posts.

15. The animal restraining device according to claim 1, wherein each of said adjacent support posts at said one side has a bracket extending therefrom, said brackets having cradles adapted to support a respective said support member therein downwardly spaced from said first bearing surface.

16. The animal restraining device according to claim 15, wherein said frame has an interior bounded by said polygon configuration, and said brackets extend outwardly from said interior of said frame.

* * * * *